US012509086B2

(12) United States Patent
Schwarz

(10) Patent No.: US 12,509,086 B2
(45) Date of Patent: Dec. 30, 2025

(54) DEVICE FOR ACTIVATING/DEACTIVATING A MANEUVERING MODE OF A DRIVE IN A HYBRID VEHICLE

(71) Applicant: Bayerische Motoren Werke Aktiengesellschaft, Munich (DE)

(72) Inventor: Johannes Schwarz, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 813 days.

(21) Appl. No.: 16/536,480

(22) Filed: Aug. 9, 2019

(65) Prior Publication Data

US 2019/0359212 A1 Nov. 28, 2019

Related U.S. Application Data

(63) Continuation of application No. PCT/EP2018/054706, filed on Feb. 26, 2018.

(30) Foreign Application Priority Data

Mar. 15, 2017 (DE) ..................... 10 2017 204 272.9

(51) Int. Cl.
*B60W 30/182* (2020.01)
*B60W 10/08* (2006.01)
(Continued)

(52) U.S. Cl.
CPC .......... *B60W 30/182* (2013.01); *B60W 10/08* (2013.01); *B60W 30/06* (2013.01);
(Continued)

(58) Field of Classification Search
CPC ....... Y02E 60/10; B60W 10/08; B60W 20/00; B60W 20/13; B60W 30/18018;
(Continued)

(56) References Cited

U.S. PATENT DOCUMENTS

2014/0039744 A1 2/2014 Morisaki
2014/0074330 A1* 3/2014 Malone ................ B60W 10/08 701/99

(Continued)

FOREIGN PATENT DOCUMENTS

CN 103459221 A 12/2013
DE 10 2008 000 629 A1 9/2009

(Continued)

OTHER PUBLICATIONS

International Search Report (PCT/ISA/210) issued in PCT Application No. PCT/EP2018/054706 dated May 4, 2018 with English translation (five (5) pages).

(Continued)

*Primary Examiner* — Aniss Chad
*Assistant Examiner* — Stephanie T Su
(74) *Attorney, Agent, or Firm* — Crowell & Moring LLP

(57) ABSTRACT

A device activates/deactivates a maneuvering mode of a drive in a hybrid vehicle, wherein the drive has a combustion engine and an electric motor. The device has a detection unit for detecting whether an electronic parking aid is activated, and a switching unit for activating a maneuvering mode if the electronic parking aid is activated, wherein starting of the combustion engine is deactivated in the maneuvering mode.

10 Claims, 1 Drawing Sheet

(51) Int. Cl.

| | |
|---|---|
| ***B60W 30/06*** | (2006.01) |
| ***B60W 50/00*** | (2006.01) |
| ***B60W 50/08*** | (2020.01) |
| ***B60W 50/14*** | (2020.01) |

(52) U.S. Cl.
CPC .......... *B60W 50/082* (2013.01); *B60W 50/14* (2013.01); *B60W 2050/0096* (2013.01)

(58) Field of Classification Search
CPC .... B60W 30/182; B60W 30/06; B60W 50/14; B60W 2050/0096
See application file for complete search history.

(56) References Cited

U.S. PATENT DOCUMENTS

| | | | | |
|---|---|---|---|---|
| 2017/0072943 | A1 | 3/2017 | Pedlar et al. | |
| 2017/0129502 | A1 | 5/2017 | Stoffels et al. | |
| 2018/0050685 | A1 * | 2/2018 | Atluri .................. | B60W 10/02 |

FOREIGN PATENT DOCUMENTS

| | | | | |
|---|---|---|---|---|
| DE | 10 2014 220 123 A1 | 4/2016 | | |
| DE | 10 2016 116 328 A1 | 3/2017 | | |
| DE | 10 2015 221 752 A1 | 5/2017 | | |
| EP | 3 269 606 A1 | 1/2018 | | |
| JP | 2011-135655 A | 7/2011 | | |
| KR | 10-2014-0135359 A | 11/2014 | | |
| KR | 20140135359 A * | 11/2014 | ............ | B60W 30/06 |

OTHER PUBLICATIONS

German-language Written Opinion (PCT/ISA/237) issued in PCT Application No. PCT/EP2018/054706 dated May 4, 2018 (six (6) pages).

German-language Search Report issued in counterpart German Application No. 10 2017 204 272.9 dated Feb. 12, 2018 with partial English translation (11 pages).

Chinese-language Office Action issued in Chinese Application No. 201880005550.9 dated Oct. 20, 2021 with English translation (20 pages).

* cited by examiner

DEVICE FOR ACTIVATING/DEACTIVATING A MANEUVERING MODE OF A DRIVE IN A HYBRID VEHICLE

CROSS REFERENCE TO RELATED APPLICATIONS

This application is a continuation of PCT International Application No. PCT/EP2018/054706, filed Feb. 26, 2018, which claims priority under 35 U.S.C. § 119 from German Patent Application No. 10 2017 204 272.9, filed Mar. 15, 2017, the entire disclosures of which are herein expressly incorporated by reference.

BACKGROUND AND SUMMARY OF THE INVENTION

The present invention relates to an apparatus for activating/deactivating a maneuvering mode of a drive in a hybrid vehicle. In addition, the present invention relates to a hybrid vehicle having such an apparatus and to a method for activating/deactivating a maneuvering mode of a drive in a hybrid vehicle. On top of that, the present invention relates to a computer program product that prompts performance of such a method on a program-controlled device.

Hybrid vehicles, i.e. motor vehicles having an electric drive (electric motor) and a further drive, such as for example an internal combustion engine, can have different modes of operation. By way of example, in one mode of operation, primarily the electric motor can provide the drive, whereas in another mode of operation, the internal combustion engine starts right from when the brake is released. These modes of operation can be selected by the user or selected by the vehicle depending on the availability of the respective energy (electricity or fuel).

Depending on the chosen mode of operation or according to the state of charge of the battery for the electric motor, a different vehicle behavior exists for parking/positioning maneuvers. It may therefore come about that the user notices multiple internal combustion engine starts during a maneuvering process. This can be perceived as a disturbance acoustically and on account of vehicle vibrations, which is why hybrid vehicles can have a maneuvering function that is activated by the reverse gear. During this maneuvering function, the internal combustion engine is deactivated. The user is therefore provided with an opportunity for extended electric motor driving, i.e. driving by electric motor, without being influenced by internal combustion engine starts. This extended electric motor driving is usually maintained for a particular time, even if the user shifts from reverse gear into another gear, for example into drive position D in an automatic vehicle.

However, the user is frequently unable to tell what driving behavior by the vehicle can currently be expected. In particular in a mode of operation in which a sporty driving experience has been selected, the internal combustion engine is normally engaged when moving off, outside maneuvering, in order to provide this sporty driving experience. When the internal combustion engine is deactivated on the basis of the maneuvering function, however, the internal combustion engine is initially not engaged even when moving off outside maneuvering. In that case, the user is unable to see why the internal combustion engine is not activated.

Against this background, it is an object of the present invention to simplify the activation of a maneuvering mode for a user.

Accordingly, an apparatus for activating/deactivating a maneuvering mode of a drive of a hybrid vehicle is proposed. The drive in this case has an internal combustion engine and an electric motor.

To allow a user to activate the maneuvering mode in a simple manner and to detect whether the maneuvering mode is activated, the present apparatus has provision for a detection unit that is configured to detect whether an electronic parking aid is activated. If this is the case, a changeover unit provided for in the apparatus activates the maneuvering mode, wherein starting of the internal combustion engine is deactivated in the maneuvering mode. The coupling of the activation of the maneuvering mode and activation of the electronic parking aid provides the user with a simple opportunity to detect whether the maneuvering mode is active. Additionally, the user can activate the maneuvering mode in a simple manner by actively activating the electronic parking aid.

In this context, a hybrid vehicle (also referred to as a hybrid electric motor vehicle or a vehicle with a hybrid drive) is understood to mean a motor vehicle that is driven by an electric motor and an internal combustion engine. This also includes hybrid vehicles having a small electric motor, what are known as mild hybrid vehicles. The hybrid vehicle usually draws energy for the electric motor from a storage device for electrical energy, i.e. a battery provided in the vehicle and, for the internal combustion engine, from an operating fuel tank.

When the electronic parking aid is activated, it is assumed that the user, i.e. the vehicle driver, wants to drive only a short distance at a low speed. The internal combustion engine is not required for this and can thus remain deactivated, which means that purely electric driving is performed. When torque is required again—by the user or on the basis of the driving situation —, i.e. the vehicle is no longer in the maneuvering mode, the internal combustion engine is activated again and can be engaged.

In the simplest case, the electronic parking aid can be a distance sensor indicating the distance from another vehicle or other objects. Such a distance sensor can be a radar or ultrasonic sensor, or else a camera system. The distance sensor in this case may be fitted to a front and/or rear of the vehicle. In an extended form, the electronic parking aid can have not only a distance sensor but also a reversing and/or surroundings camera.

The electronic parking aid may also be a parking assist system that performs (at least partially) automated parking or maneuvering of the vehicle.

The respective unit, for example changeover unit or detection unit, can be implemented in hardware and/or also in software. In the case of a hardware implementation, the respective unit may be in the form of an apparatus or in the form of part of an apparatus, for example in the form of a computer or in the form of a microprocessor. In the case of a software implementation, the respective unit may be in the form of a computer program product, in the form of a function, in the form of a routine, in the form of part of a program code or in the form of an executable object.

According to one embodiment, the changeover unit is configured to deactivate the maneuvering mode if the detection unit detects that the electronic parking aid is deactivated.

In this manner, the maneuvering mode is not maintained over a particular period, but rather is likewise deactivated when the electronic parking aid is deactivated. As a result of this coupling of the maneuvering mode and the electronic parking aid, the user is able to tell in a simple manner when the internal combustion engine is deactivated, and will therefore expect no assistance from the internal combustion engine while the electronic parking aid is activated.

According to a further embodiment, the maneuvering mode is automatically activable and/or deactivable.

Automatic activation can be effected for example as a result of a slow approach to another vehicle or object. The coupling of the maneuvering mode to the electronic parking aid allows the maneuvering mode to be always automatically activated when the electronic parking aid is activated.

According to a further embodiment, the maneuvering mode is manually activable and/or deactivable.

By way of example, the maneuvering mode may be activable by operating a switch for activating the electronic parking aid. The switch can cause the electronic parking aid to be turned on directly, for example when a distance sensor is turned on. Alternatively, the switch can be used to activate a reversing camera or the like that is coupled to and/or forms the electronic parking aid. In the same manner, the maneuvering mode can be manually deactivated again by virtue of the electronic parking aid being deactivated by the user.

According to a further embodiment, the apparatus has a display unit for visually and/or audibly indicating the activated maneuvering mode.

The display unit can indicate the activated maneuvering mode as a visual signal, e.g. a light signal, for example by means of a display of the electronic parking aid. Alternatively, the display unit can output an audible signal, e.g. an announcement, in order to indicate to the user that the maneuvering mode is active. In this manner, the user has at any time the information that the maneuvering mode is activated and therefore the internal combustion engine is not available for the drive.

According to a further embodiment, the changeover unit is configured so as, when the maneuvering mode is activated, to determine whether the drive requires the internal combustion engine to be started, and, if so, to activate starting of the internal combustion engine in the maneuvering mode.

This embodiment allows the drive to be changed over from electric mode to internal combustion engine if there is too little battery power available for the electric motor. In that case, the internal combustion engine is reactivated again in the maneuvering mode. The user can be notified of this by means of a visual and/or audible indication. When the internal combustion engine has been activated, there is provision in this case for the internal combustion engine to remain activated for the entire maneuvering mode.

Starting of the internal combustion engine during the maneuvering mode may for example also be required when the driver demands more torque from the vehicle than the electric motor can provide, or when a sporty driving mode is selected in which there is likewise more torque required from the vehicle than the electric motor can provide. In these cases too, the internal combustion engine remains activated as soon as it has once been activated during the maneuvering mode.

According to a further aspect, a hybrid vehicle is proposed. The hybrid vehicle has a drive having an internal combustion engine and an electric motor. In addition, the hybrid vehicle has an apparatus for activating/deactivating a maneuvering mode of the drive, as described above.

According to a further aspect, a method for activating/deactivating a maneuvering mode of a drive in a hybrid vehicle is proposed, wherein the drive has an internal combustion engine and an electric motor. The method has the following steps: detecting whether an electronic parking aid is activated, and, if this is the case, activating a maneuvering mode, in which the starting of the internal combustion engine is deactivated.

The embodiments and features described for the proposed apparatus apply to the proposed method accordingly.

Furthermore, a computer program product is proposed that has a program code that is designed to prompt performance of the method explained above on a computer.

A computer program product, such as e.g. a computer program means, can be provided or supplied for example as a storage medium, such as e.g. a memory card, USB stick, CD-ROM, DVD, or else in the form of a downloadable file from a server in a network. This can be effected for example in a wireless communication network by means of the transmission of an appropriate file having the computer program product or the computer program means.

Further possible implementations of the invention comprise combinations, which are also not explicitly cited, of features or embodiments described above or below for the exemplary embodiments. In this case, a person skilled in the art will also add individual aspects to the respective basic form of the invention as improvements or additions.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, elements that are the same or that have the same function have been provided with the same reference signs, unless indicated otherwise.

Figure 1:
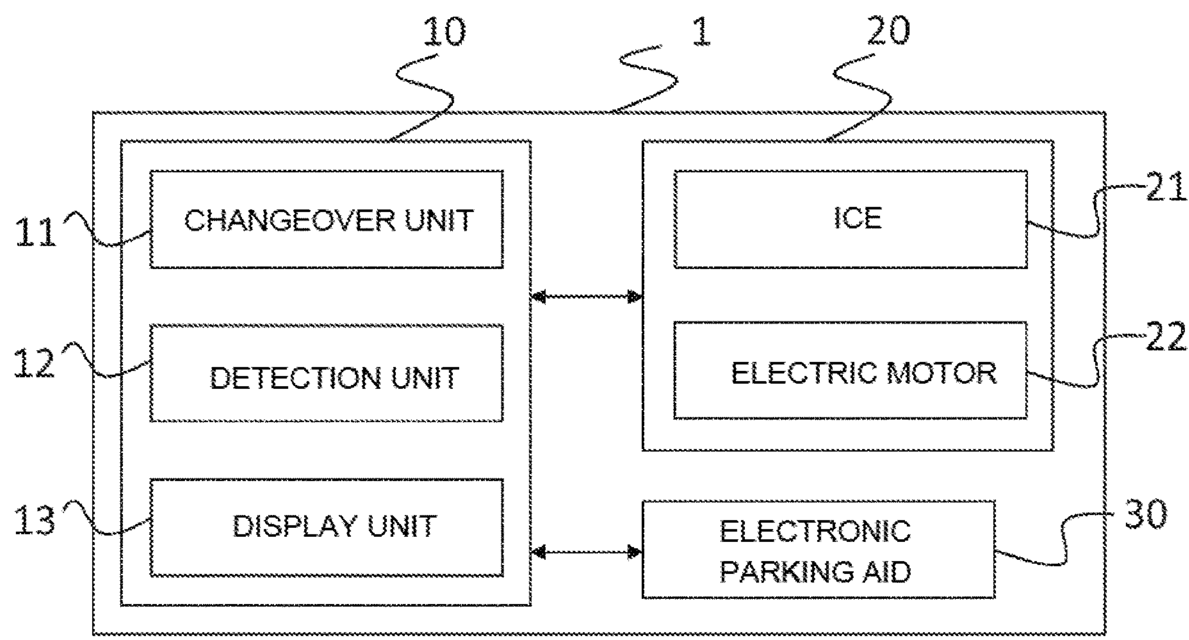
FIG. 1 is a schematic block diagram of a hybrid vehicle having an apparatus for activating/deactivating a maneuvering mode.

FIG. 1 shows a hybrid vehicle 1 that has a drive 20 having an internal combustion engine 21 and an electric motor 22. The two engines can contribute to the drive in different proportions, depending on the mode of operation. In a maneuvering mode, intended for parking or maneuvering the vehicle 1, only the electric motor 22 is used. During normal driving, a combination of electric motor and internal combustion engine 22, 21 can be used, for example when a higher torque is demanded than the electric motor 22 alone can deliver. If the state of charge of the battery for the electric motor 22 is too low, only the internal combustion engine 21 is used for the drive.

In order to activate and/or deactivate the maneuvering mode, there is provision for an apparatus 10. This has a changeover unit 11, a detection unit 12 and a display unit 13.

The changeover unit 11 is used to change over between the different modes of operation. In the maneuvering mode, the changeover unit 11 deactivates the internal combustion engine 21, so that only the electric motor 22 is available for the drive 20.

In order to now change to the maneuvering mode, the detection unit 12 first of all detects whether an electronic parking aid 30 is activated. The electronic parking aid 30 may be for example a distance sensor for determining the distance of the vehicle 1 from another vehicle or other object.

If the electronic parking aid 30 is activated, the changeover unit 11 switches to the maneuvering mode. If, when activating the maneuvering mode, the changeover unit 11 establishes that the battery power for the electric motor 22 is not sufficient, starting of the internal combustion engine 21 in the maneuvering mode is activated again, since otherwise no drive 20 is possible.

The activated maneuvering mode can be indicated by the display unit 13. This can be effected by a visual or an audible signal.

If the electronic parking aid 30 is deactivated again, for example by operating a switch, the maneuvering mode is also deactivated and the internal combustion engine 21 is available for the drive 20 again.

Figure 2:
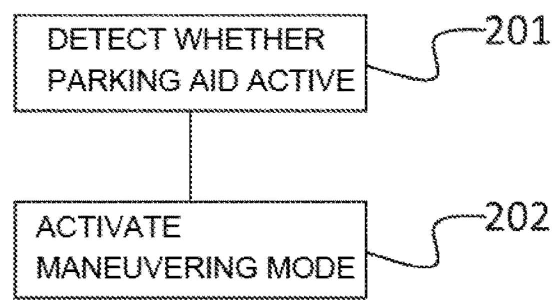
FIG. 2 is a schematic flowchart for a method for activating/deactivating a maneuvering mode.

FIG. 2 shows an appropriate method for activating/deactivating the maneuvering mode of the drive 20.

A first step 201 involves initially detecting whether an electronic parking aid 30 is activated.

If this is the case, the maneuvering mode is activated in a next step 202. In the maneuvering mode, only the electric motor 22 is available for the drive 20, which means that the user is not disturbed by starts by the internal combustion engine 21 during maneuvering, e.g. parking. When the parking aid 30 is deactivated again, the maneuvering mode is also deactivated again and the internal combustion engine 21 is available again.

The apparatus 10 and the method for activating/deactivating the maneuvering mode of a drive mean that it is a simple matter for the user or vehicle driver to see a relationship between maneuvering mode (i.e. only the electric motor 22 is available for the drive 20) and active electronic parking aid 30. Therefore, the user firstly knows that only the electric motor 22 is available and expects no assistance from the internal combustion engine 21. Secondly, the user can himself actively deactivate the electronic parking aid 30 in order to use the internal combustion engine 21 for the drive 20.

Although the present invention has been described on the basis of exemplary embodiments, it is modifiable in a wide variety of ways.

REFERENCE SIGNS

1 Hybrid vehicle
10 Apparatus
11 Changeover unit
12 Detection unit
13 Display unit
20 Drive
21 Internal combustion engine
22 Electric motor
30 Electronic parking aid
201-202 Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for at least one of activating or deactivating a maneuvering mode of a drive in a hybrid vehicle, wherein the drive has an internal combustion engine and an electric motor, comprising:

a processor comprising:
- a detection unit that is configured to detect whether an electronic parking aid is activated, and
- a changeover unit that is configured to activate a maneuvering mode when the detection unit detects that the electronic parking aid is activated, wherein the changeover unit is further configured:
- to initially deactivate starting of the internal combustion engine at a beginning of the maneuvering mode,
- while the maneuvering mode is activated, to determine whether the drive requires the internal combustion engine to be started, and
- upon determining that the drive requires the internal combustion engine to be started while the maneuvering mode is activated, to activate starting of the internal combustion engine in the maneuvering mode after the starting of the internal combustion engine was initially deactivated, such that the internal combustion engine is used to operate the vehicle during a remainder of the maneuvering mode without using the electric motor during the remainder of the maneuvering mode.

2. The apparatus according to claim 1, wherein the changeover unit is further configured to deactivate the maneuvering mode when the detection unit detects that the electronic parking aid is deactivated.

3. The apparatus according to claim 1, wherein the maneuvering mode is at least one of automatically activable or automatically deactivable.

4. The apparatus according to claim 1, wherein the maneuvering mode is at least one of manually activable or manually deactivable.

5. The apparatus according to claim 1, further comprising: a switch that activates the electronic parking aid, wherein the maneuvering mode is at least one of activable or deactivable by operating the switch.

6. The apparatus according to claim 5, further comprising: a display for at least one of visually or audibly indicating the activated maneuvering mode.

7. The apparatus according to claim 1, further comprising: a display for at least one of visually or audibly indicating the activated maneuvering mode.

8. A hybrid vehicle, comprising:

a drive that has an internal combustion engine and an electric motor; and an apparatus for at least one of activating or deactivating a maneuvering mode of the drive according to claim 1.

9. A method for at least one of activating or deactivating a maneuvering mode of a drive in a hybrid vehicle, wherein the drive has an internal combustion engine and an electric motor, the method comprising the acts of:

detecting whether an electronic parking aid is activated;

upon detecting that the electronic parking aid is activated, activating a maneuvering mode, wherein activating the maneuvering mode comprises initially deactivating starting of the internal combustion engine at a beginning of the maneuvering mode;

while the maneuvering mode is activated, determining whether the drive requires the internal combustion engine to be started; and, upon determining that the drive requires the internal combustion engine to be started while the maneuvering mode is activated, activating starting of the internal combustion engine in the maneuvering mode after the starting of the internal combustion engine was initially deactivated, such that the internal combustion engine is used to operate the vehicle during a remainder of the maneuvering mode without using the electric motor during the remainder of the maneuvering mode.

10. A computer product comprising a non-transitory computer readable medium having stored thereon program code that, when executed by a processor, carries out the acts of:

detecting whether an electronic parking aid is activated;

upon detecting that the electronic parking aid is activated, activating a maneuvering mode, wherein activating the maneuvering mode comprises initially deactivating starting of the internal combustion engine at a beginning of the maneuvering mode;

while the maneuvering mode is activated, determining whether the drive requires the internal combustion engine to be started; and, upon determining that the drive requires the internal combustion engine to be started while the maneuvering mode is activated, activating starting of the internal combustion engine in the maneuvering mode after the starting of the internal combustion engine was initially deactivated, such that the internal combustion engine is used to operate the vehicle during a remainder of the maneuvering mode without using the electric motor during the remainder of the maneuvering mode.

* * * * *